United States Patent
Kato et al.

(10) Patent No.: US 6,806,305 B2
(45) Date of Patent: Oct. 19, 2004

(54) DISPERSION STABILIZER FOR SUSPENSION POLYMERIZATION OF VINYL COMPOUND

(75) Inventors: Masaki Kato, Kurashiki (JP); Naokiyo Inomata, Tokyo (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/265,222

(22) Filed: Oct. 7, 2002

(65) Prior Publication Data

US 2003/0092835 A1 May 15, 2003

(30) Foreign Application Priority Data

Oct. 5, 2001 (JP) ........................................ 2001-310045

(51) Int. Cl.$^7$ .................................................. C08L 9/04
(52) U.S. Cl. ...................................... 524/459; 526/344
(58) Field of Search ................................ 524/459, 514, 524/556, 557; 526/344, 330, 319; 252/363.5

(56) References Cited

U.S. PATENT DOCUMENTS

| | | | |
|---|---|---|---|
| 5,308,911 A | * 5/1994 | Takada et al. | ............... 524/503 |
| 5,334,575 A | * 8/1994 | Noonan et al. | ............. 503/227 |
| 5,717,044 A | 2/1998 | Takada | |
| 6,451,898 B1 | 9/2002 | Tanimoto et al. | |
| 6,485,842 B1 | 11/2002 | Shindome et al. | |
| 6,495,623 B1 | 12/2002 | Tanimoto et al. | |
| 6,635,709 B2 | * 10/2003 | Kato et al. | ..................... 525/57 |

FOREIGN PATENT DOCUMENTS

| | | | |
|---|---|---|---|
| DE | 28 02 063 | 7/1978 | |
| EP | 0 560 264 | 9/1993 | |
| EP | 560264 A1 | * 9/1993 | ............. C08F/2/20 |
| EP | 1 174 444 | 1/2002 | |
| EP | 1174444 A1 | * 1/2002 | ........... C08F/14/06 |
| JP | 54-127490 | 10/1979 | |
| JP | 1-95104 | 4/1989 | |
| JP | 3-140303 | 6/1991 | |
| JP | 6-80709 | 3/1994 | |
| JP | 8-259609 | 10/1996 | |
| JP | 9-241308 | 9/1997 | |
| JP | 10-251311 | 9/1998 | |
| JP | 2000-309602 | 11/2000 | |
| JP | 2002-97208 | 4/2002 | |
| JP | 2002-97209 | 4/2002 | |
| JP | 2002-97210 | 4/2002 | |

* cited by examiner

*Primary Examiner*—William K. Cheung
(74) *Attorney, Agent, or Firm*—Oblon, Spivak, McClelland, Maier & Neustadt, P.C.

(57) ABSTRACT

A dispersion stabilizer for suspension polymerization of a vinyl compound contains a modified saponified vinyl ester copolymer (A) having an ethylene content of 1 to 20 mol %, a degree of saponification of 90 mol % or more and a degree of polymerization of 100 to 3,000, a saponified vinyl ester polymer (B) having a degree of saponification of 60 to 90 mol % and a degree of polymerization of 600 to 4,000, and a saponified vinyl ester polymer (C) having a degree of saponification of 30 to 60 mol % and a degree of polymerization of 100 to 600, and in which a component (A)/ {component (B)+component (C)} weight ratio if 5/95 to 40/60. The dispersion stabilizer for suspension polymerization of the vinyl compound exhibits quite excellent suspension polymerization stability. Further, the suspension polymerization of a vinyl compound using this dispersion stabilizer can produce a resin having a high bulk density minimizes the formation of milky turbid waste water.

15 Claims, No Drawings

DISPERSION STABILIZER FOR SUSPENSION POLYMERIZATION OF VINYL COMPOUND

BACKGROUND OF THE INVENTION

1. Field of the Invention

The present invention relates to a dispersion stabilizer. The invention also relates to a dispersion stabilizer for suspension polymerization of a vinyl compound, which exhibits excellent suspension polymerization stability, can produce vinyl polymer granules having a high bulk density through suspension polymerization of a vinyl compound, and can prevent a milky turbidity of waste water after suspension polymerization.

2. Discussion of the Prior Art

The production of a vinyl polymer such as a vinyl chloride resin has been widely conducted industrially by suspension polymerization in which a vinyl compound such as vinyl chloride is dispersed in an aqueous medium in the presence of a dispersion stabilizer and polymerization is conducted using an oil-soluble initiator. In general, the factors governing the quality of the resulting vinyl polymer include conversion, water/monomer ratio, polymerization temperature, type and amount of initiator, type of polymerization vessel, stirring rate and type of dispersion stabilizer. Among these factors, the type of dispersion stabilizer has a significant effect.

Vinyl chloride resin is a general-purpose resin, that is cost effective and offers several advantageous physical and chemical properties. To achieve high throughput and processing productivity it is desirable for the resin to have a high bulk density and excellent processability.

Relating to a method for obtaining a resin having a high bulk density and an excellent processability, Japanese Patent Laid-Open No. 259,609/1996 discloses a method using a dispersion stabilizer, which is made of a modified polyvinyl alcohol having an ethylene unit content of 1 to 24 mol % and a degree of saponification of more than 80 mol %. Japanese Patent Laid-Open Nos. 241,308/1997 and 251,311/1998 disclose a method using a dispersion stabilizer which comprises at least one kind of partially saponified polyvinyl acetate having a degree of saponification of 85 mol % or more. The above-mentioned methods provide resins of high bulk density but are problematic in that waste water formed after suspension polymerization is milky turbid and the chemical oxygen demand (COD) of the waste water is high. Japanese Patent Laid-Open No. 309,602/2000 proposes a method using a dispersion stabilizer made of a vinyl alcohol polymer and an alkali metal salt, however the bulk density and sharpness of the particle size distribution of the resin are not satisfactory.

SUMMARY OF THE INVENTION

Accordingly, it is an object of the invention to provide a dispersion stabilizer for suspension polymerization of vinyl compounds, which exhibits excellent suspension polymerization stability, can produce resin having high bulk density, and can prevent the formation of milky turbid waste water after suspension polymerization.

The inventors have found that the foregoing object is attained by a dispersion stabilizer for suspension polymerization of a vinyl compound, which comprises a modified saponified vinyl ester copolymer (A) having an ethylene unit content of 1 to 20 mol %, a degree of saponification of 90 mol % or more and a degree of polymerization of 100 to 3,000, a saponified vinyl ester polymer (B) having a degree of saponification of 60 to 90 mol % and a degree of polymerization of 600 to 4,000, and a saponified vinyl ester polymer (C) having a degree of saponification of 30 to 60 mol % and a degree of polymerization of 100 to 600, and in which the weight ratio component (A)/{component (B)+ component (C)} is 5/95 to 40/60.

DESCRIPTION OF THE PREFERRED EMBODIMENTS

In the dispersion stabilizer for suspension polymerization of the invention, the content of the ethylene unit of the modified saponified vinyl ester copolymer (A) is 1 to 20 mol %, preferably 1 to 18 mol %, more preferably 1 to 15 mol %, most preferably 2 to 10 mol %. When the content of the ethylene unit is less than 1 mol %, adhesion of scales to a reaction vessel is increased. When it exceeds 20 mol %, the water solubility of the modified saponified vinyl ester copolymer is decreased and detrimentally affects the handleability of the resin.

The degree of saponification of the modified saponified vinyl ester copolymer (A) is 90 mol % or more, preferably 91 mol % or more, more preferably 92 mol % or more. When the degree of saponification is less than 90 mol %, a resin having a high bulk density cannot be obtained.

The degree of polymerization of the modified saponified vinyl ester copolymer (A) is 100 to 3,000, preferably 150 to 2,800, more preferably 200 to 2,600, most preferably 250 to 2,200. When the degree of polymerization of the saponified vinyl ester copolymer exceeds 3,000, the waste water after polymerization become milky turbid. When the degree of polymerization of the modified saponified vinyl ester copolymer is less than 100, a resin having a high bulk density cannot be obtained.

The degree of saponification of the saponified vinyl ester polymer (B) in the invention is 60 to 90 mol %, preferably 60 to 88 mol %, more preferably 60 to 85 mol %. When the degree of saponification exceeds 90 mol %, the polymerization stability might be decreased.

The degree of polymerization of the saponified vinyl ester polymer (B) is 600 to 4,000, preferably 600 to 3,800, more preferably 600 to 3,500. When the degree of polymerization is less than 600, the polymerization stability might be decreased.

The degree of saponification of the saponified vinyl ester polymer (C) in the invention is 30 to 60 mol %, preferably 32 to 59 mol %, more preferably 35 to 58 mol %. When the degree of saponification exceeds 60 mol %, the plasticizer absorption of the resin obtained by the suspension polymerization might be decreased. When the degree of saponification is less than 30 mol %, the water solubility of the saponified vinyl ester polymer might be decreased to worsen the handleability.

The degree of polymerization of the saponified vinyl ester polymer (C) is 100 to 600, preferably 120 to 580, more preferably 150 to 550. When the degree of polymerization is less than 100, a resin having a high bulk density cannot be obtained.

Further, it is preferable that a difference in degree of saponification between the vinyl saponified ester polymer (B) and the saponified vinyl ester polymer (C) is 10 mol % or more and/or a difference in degree of polymerization therebetween is 200 or more.

Relating to the ratio of the modified saponified vinyl ester copolymer (A), the saponified vinyl ester polymer (B) and the saponified vinyl ester polymer (C) in the dispersion stabilizer for suspension polymerization in the invention, the component (A)/{component (B)+component (C)} weight ratio is 5/95 to 40/60 based upon the total weights of each saponified vinyl ester polymer. The lower limit of the weight ratio is preferably 6/94 or more, more preferably 7/93 or more. The upper limit of the weight ratio is preferably 38/62 or less, more preferably 35/65 or less. When the component (A)/{component (B)+component (C)} weight ratio is less than 5/95, a resin having a high bulk density might not be obtained. When the component (A)/{component (B)+component (C)} weight ratio exceeds 40/60, the plasticizer absorption of the resin obtained by the suspension polymerization might be decreased.

In the dispersion stabilizer for suspension polymerization in the invention, the saponified vinyl ester polymer (B)/saponified vinyl ester polymer (C) ratio is not strictly limited. It is preferable that the component (B)/component (C) weight ratio is 20/80 to 90/10. The lower limit of the weight ratio is preferably 25/75 or more, more preferably 30/70 or more. The upper limit of the weight ratio is preferably 85/15 or less, more preferably 80/20 or less. When the component (B)/component (C) weight ratio is less than 20/80, a resin having a high bulk density might not be obtained. When the component (B)/component (C) weight ratio exceeds 90/10, the plasticizer absorption of the resin obtained by the suspension polymerization might be decreased.

In the invention, the amount of the modified saponified vinyl ester copolymer (A), the saponified vinyl ester polymer (B) and the saponified vinyl ester polymer (C) in the dispersion stabilizer is not particularly limited. It is preferably 0.01 to 5 parts by weight, more preferably 0.02 to 2 parts by weight, further preferably 0.02 to 1 part by weight per 100 parts by weight of the vinyl compound. When it is less than 0.01 part by weight, the polymerization stability tends to be decreased in the suspension polymerization of the vinyl compound. When it exceeds 5 parts by weight, there is a tendency that waste water after the suspension polymerization is milky turbid and chemical oxygen demand (COD) is increased.

In the invention, the modified saponified vinyl ester copolymer (A) can be obtained by a known method, for example, a method described in Japanese Patent Laid-Open No. 259,609/1996, namely, the copolymerization of a vinyl ester monomer and ethylene and saponifying the resulting copolymer in a usual manner. The saponified vinyl ester polymer (B) and the saponified vinyl ester polymer (C) can be also obtained by a known method, namely, a polymerizing vinyl ester monomer and the saponifying resulting polymer in a usual manner. As a method for polymerizing the above mentioned monomer, a known method such as solution polymerization, bulk polymerization, suspension polymerization or emulsion polymerization can be employed.

As a polymerization initiator used in the above mentioned polymerizations an azo initiator, a peroxide initiator or a redox initiator may be selected, depending on the polymerization method. Examples of azo initiators include 2,2'-azobisisobutyronitrile, 2,2'-azobis(2,4-dimethylvaleronitrile) and 2,2'-azobis(4-methoxy-2,4-dimethylvaleronitrile). Examples of peroxide initiators include percarbonate compounds such as diisopropyl peroxydicarbonate, di-2-ethylhexyl peroxydicarbonate and diethoxyethyl peroxydicarbonate; per-ester compounds such as t-butyl peroxyneodecanate, α-cumyl peroxyneodecanate and t-butyl peroxydecanate; acetylcyclohexylsulfonyl peroxide and 2,4,4-trimethylpentyl 2-peroxyphenoxyacetate. Further, these can be used as initiators in combination with potassium persulfate, ammonium persulfate and hydrogen peroxide. Examples of a redox initiator include a combination of the above mentioned peroxide and a reductant such as sodium hydrogensulfite, sodium hydrogencarbonate, tartaric acid, L-ascorbic acid and Rongalit.

The saponification can be carried out by alcoholysis or hydrolysis using a known alkali catalyst or acid catalyst. Examples of alkali catalyst include an alkaline metal hydroxide compound such as sodium hydroxide, potassium hydroxide; an alkaline earth metal hydroxide compound such as magnesium hydroxide and calcium hydroxide; an amine compound such as ammonia, triethylamine and ethylenediamine. Examples of acid catalyst include hydrochloric acid, sulfuric acid, p-toluenesulfonic acid, benzoic acid, acetic acid, lactic acid, carbonic acid, oxalic acid and maleic acid. Among others, a saponification reaction using methanol as a solvent and an NaOH catalyst is simple and most preferable.

Examples of the vinyl ester monomer include vinyl formate, vinyl acetate, vinyl propionate, vinyl butyrate, vinyl isobutyrate, vinyl pivalate, vinyl versatate, vinyl caproate, vinyl caprylate, vinyl laurylate, vinyl palmitate, vinyl stearate, vinyl oleate and vinyl benzoate. Of these, vinyl acetate is most preferable.

In the invention, an ionic group such as a carboxyl group, a sulfonic group, an amino group or an ammonium group can be introduced to the modified saponified vinyl ester copolymer (A), the saponified vinyl ester polymer (B) and the saponified vinyl ester polymer (C) to increase the water solubility thereof. Alternatively, a nonionic group or an alkyl group having carbon 2 to 16 atoms may be introduced. Among these, it is preferable that an ionic group such as a carboxyl group, a sulfonic group, an amino group or an ammonium group is a part of the mentioned polymer to increase the water solubility. It is advisable that the dispersion stabilizer of the invention is soluble or dispersible in water having a temperature of 5 to 100° C., preferably 10 to 90° C.

The modified saponified vinyl ester copolymer having a substituent group such as an ionic group, nonionic group or an alkyl group having 2 to 16 carbon atoms can be obtained by a known method. Namely, a vinyl ester monomer, ethylene, and a monomer having a substituent such as an ionic group, nonionic group or an alkyl group having 2 to 16 carbon atoms are copolymerized, and the resulting modified vinyl ester polymer is saponified. Further, an end modified polymer can also be used, which can be obtained by a known method, namely a vinyl ester monomer and ethylene are copolymerized in the presence of a thiol compound such as a thiolacetic acid or mercaptopropionic acid and the resulting modified vinyl ester polymer is saponified.

Similarly, the saponified vinyl ester polymer having a substituent group such as an ionic group, nonionic group or an alkyl group having 2 to 16 carbon atoms can be obtained by a known method. Namely, a vinyl ester monomer and a monomer having a substituent such as an ionic group, nonionic group or an alkyl group having carbon atoms of 2 to 16 are copolymerized, and the resulting modified vinyl ester polymer is saponified. Further, an end modified polymer can also be used, which can be obtained by a known method, namely a vinyl ester monomer is polymerized in the presence of a thiol compound such as a thiolacetic acid or mercaptopropionic acid and the resulting modified vinyl ester polymer is saponified.

The degree of saponification of the above mentioned polymer is obtained from a ratio of a vinyl ester group and a vinyl alcohol group. The degree of saponification of any of the ionic group, the nonionic group or the alkyl group is not included therein.

The above-mentioned monomer having an ionic group is not particularly limited. Examples thereof include carboxyl group-containing monomers such as crotonic acid, maleic acid, fumaric acid, itaconic acid and (meth)acrylic acid, and salts thereof; sulfonic acid-containing monomers such as ethylenesulfonic acid, (meth)allylsulfonic acid, sulfoalkyl maleate, sulfoalkyl (meth)acrylate and (meth)acrylamido-2-methylpropanesulfonic acid, and salts thereof; amino or ammonium group-containing monomers such as N-(1,1-dimethyl-3-dimethylaminopropyl)(meth)acrylamide, N-(1,1-dimethyl-3-dimethylaminobutyl)(meth)acrylamide, N-vinylimidazole, 2-methyl-N-vinylimidazole, vinyl-3-dimethylaminopropyl ether, vinyl-2-dimethylaminoethyl ether, allyl-3-dimethylaminopropyl ether, allyldimethylamine and methallyldimethylamine.

In the invention, the modified saponified vinyl ester copolymer (A), the saponified vinyl ester polymer (B) and the saponified vinyl ester polymer (C) may contain other monomer units without parting from the scope of the invention. Examples of other monomers include α-olefins such as propylene, n-butene and isobutylene; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide; acrylamide derivatives such as N-methylacrylamide, N-ethylacrylamide, N,N-dimethylacrylamide, diacetonacrylamide, N-methylolacrylamide and derivatives thereof; methacrylamide; methacrylamide derivatives such as N-methylmethacrylamide, N-ethylmethacrylamide, N-methylolmethacrylamide and derivatives thereof; vinyl ethers such as methylvinyl ether, ethylvinyl ether, n-propyhrinyl ether, i-propylvinyl ether, n-butylvinyl ether, i-butylvinyl ether, t-butylvinyl ether, dodecylvinyl ether and stearylvinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; ester derivatives of unsaturated dicarboxylic acids such as maleic acid, itaconic acid and fumaric acid; vinylsilyl compounds such as vinyltrimethoxysilane; and isopropenyl acetate.

A method for suspension polymerization of vinyl compounds using the dispersion stabilizer the invention is described below.

In the suspension polymerization of vinyl compounds in an aqueous medium using the dispersion stabilizer of the invention, the temperature of the aqueous medium is not particularly limited. Cold water of approximately 20° C. and hot water of 90° C. or more can preferably be used. This aqueous medium can be pure water or an aqueous medium or an aqueous solution containing pure water and various additives or an aqueous medium containing another organic solvent. Further, in order to increase heat removal efficiency, a polymerization vessel fitted with a reflux condenser is preferably used.

The dispersion stabilizer for suspension polymerization in the invention may be used in combination with a water-soluble polymer such as polyvinyl alcohol, gelatin and water-soluble cellulose ethers represented by methyl cellulose, hydroxyethyl cellulose, hydroxypropyl cellulose and hydroxypropylmethyl cellulose; oil-soluble emulsifying agents such as sorbitan monolaurate, sorbitan trioleate, glycerin tristearate and an ethylene oxide/propylene oxide block copolymer; and water-soluble emulsifying agents such as polyoxyethylenesorbitan monolaurate, polyoxyethyleneglycerin oleate and sodium laurate; which are commonly used in the suspension polymerization of a vinyl compounds in an aqueous media. The amounts thereof are not particularly limited, and are preferably 0.01 to 1.0 part by weight per 100 parts by weight of the vinyl compound such as vinyl chloride.

In suspension polymerizations using the dispersion stabilizer of the invention, known polymerization initiators which have been so far used in the polymerization of a vinyl compound such as vinyl chloride, can be used. Examples thereof include initiators such as the initiators mentioned in the method for polymerization of the vinyl ester monomers. Other additives can also be added as required. Examples of other additives include agents for controlling degree of polymerization such as acetaldehyde, butyraldehyde, trichloroethylene, perchloroethylene and mercaptans; and polymerization inhibitors such as phenolic compound, sulfur compounds and N-oxide compounds. Further, pH adjustors, scale preventing agents and crosslinking agents can also be added as required, and in combination with the additives.

Examples of the vinyl compound to which the dispersion stabilizer for suspension polymerization of the invention can be applied include vinyl chloride singly, or vinyl chloride in combination with another monomer in which vinyl chloride is a main component (vinyl chloride 50% by weight or more). Examples of the comonomers (other monomers) copolymerizable with vinyl chloride can include vinyl esters such as vinyl acetate and vinyl propionate; (meth)acrylic acid esters such as methyl (meth)acrylate and ethyl (meth)acrylate; α-olefins such as ethylene, propylene; unsaturated carboxylic acids such as maleic anhydride and itaconic acid; acrylonitrile, styrene, vinylidene chloride, vinyl ether, and further other monomers which can be copolymerized in combination with vinyl chloride. The dispersion stabilizer of the invention can be used in the case that the above mentioned monomer is polymerized singly or are copolymerized in combination with or without vinyl chloride.

In the suspension polymerization of the vinyl compound using the dispersion stabilizer of the invention, the proportions of the components, the polymerization temperature and the like can be determined according to the conditions ordinarily employed in the suspension polymerization of a vinyl compound such as vinyl chloride. Further, the order of charging the vinyl compound, the polymerization initiator, the dispersion stabilizer, the aqueous medium and other additives and the proportions thereof are not particularly limited at all. Still further, a method in which hot water is used as the aqueous medium and the vinyl compound is heated before being charged into a polymerization vessel is preferable.

EXAMPLES

The following Examples illustrate the invention specifically, but are not intended to limit the scope of the invention.

In the following Examples, "%" and "part or parts" mean "% by weight" and "part or parts by weight" unless otherwise specified. Further, polyvinyl alcohol is sometimes abbreviated as PVA, polyvinyl acetate as PVAc and a vinyl alcohol polymer as a PVA polymer respectively.

Analysis of a Modified PVA Polymer and a PVA Polymer (1) Measurement of a degree of polymerization A degree of polymerization was measured according to JIS K 6726.

(2) Measurement of a degree of saponification

A degree of saponification was measured according to JIS K 6726.

Evaluation of a Polymerizability of a Vinyl Chloride Monomer and Properties of a Vinyl Chloride Polymer Obtained (1) Bulk density A bulk density of the vinyl chloride polymer was measured according to JIS K 6721.

(2) Scale adhesion

After a polymer slurry was withdrawn from a polymerization vessel, the condition of scale adhesion within the polymerization vessel was visually observed, and evaluated according to the following grades.

○: Adhesion of polymer scales is little confirmed.

Δ: White polymer scales can be confirmed on an inner wall of a polymerization vessel.

x: Large amounts of white polymer scales can be confirmed on an inner wall of a polymerization vessel.

(3) Clarity of waste water after polymerization

After the polymerization of vinyl chloride, the clarity of the waste water was visually observed and the transmittance of waste water was measured, then the clarity of the waste water was evaluated according to the following grades.

◎: waste water is exactly clear (transmittance 85% or more)

○: waste water is almost clear (transmittance 70% or more and less than 85%)

Δ: waste water is slightly milky turbid (transmittance 50% or more and less than 70%)

x: waste water is milky turbid (transmittance less than 50%)

The transmittance of waste water after polymerization was measured with UV spectrophotometer (Shimazu UV2100).

(wave length 500 nm, temperature 20° C., path length of measurement sample 1 cm)

Vinyl acetate (76.6 kg) and 73.3 kg of methanol were charged into a 250-liter pressure reaction vessel fitted with a stirrer, a nitrogen inlet, an ethylene inlet and an initiator inlet, and were heated at 60° C. The atmosphere of the system was then replaced with nitrogen by nitrogen bubbling for 30 minutes. Subsequently, ethylene was introduced such that the pressure of the reaction vessel reached 0.65 MPa. A solution of 2,2'-azobis(4-methoxy-2,4-dimethylvaleronitrile) as an initiator in methanol having a concentration of 2.8 g/liter was prepared, and bubbling with a nitrogen gas was conducted for nitrogen replacement. After the inner temperature of the reaction vessel was adjusted to 60° C., 32 ml of the initiator solution was poured to start the polymerization. During the polymerization, the pressure of the reaction vessel was maintained at 0.65 MPa by introducing ethylene, the polymerization temperature was maintained at 60° C., and the initiator solution was continuously added at a rate of 0.552 liter/hr. After 3 hours, the conversion reached 20%, when the cooling was conducted to stop the polymerization. After the reaction vessel was opened to remove ethylene, a nitrogen gas was bubbled to completely remove ethylene. The unreacted vinyl acetate monomer was then removed under reduced pressure to obtain a methanol solution of a modified PVAc polymer. To the solution adjusted to 30% was added an NaOH methanol solution (10% concentration) for saponification such that an alkali molar ratio (a ratio of a molar amount of NaOH to a molar amount of a vinyl ester unit in the modified PVAc polymer) reached 0.02. A degree of saponification of the modified PVA polymer was measured in a usual manner according to JIS K 6726, and found to be 98 mol %.

The methanol solution of the modified PVAc polymer obtained by removing the unreacted vinyl acetate monomer after the polymerization was charged into n-hexane to precipitate the modified PVAc polymer, and the modified PVAc polymer recovered was dissolved in acetone. This purification by reprecipitation was conducted three times, and the product was vacuum-dried at 60° C. to obtain the modified PVAc polymer purified. The content of the ethylene unit was 10 mol % as obtained by proton NMR measurement of the modified PVAc polymer. Further, the methanol solution of the modified PVAc polymer was saponified at an alkali molar ratio of 0.2. The Soxhlet extraction was conducted with methanol for 3 days, and then dried to obtain the modified PVA polymer purified. An average degree of polymerization of the modified PVA polymer was measured in a usual manner according to JIS K 6726, and found to be 500.

By the foregoing procedures, a modified PVA polymer (P-1) having a degree of polymerization of 500, a degree of saponification of 98 mol % and an ethylene content of 10 mol % was obtained.

Production Example 2 to 6 of a Modified PVA Polymer (Modified Saponified Vinyl Ester Copolymer)

The polymerization and saponification were conducted in the same manner as in Production Example 1 except that the amounts of vinyl acetate monomer, methanol and initiator, the pressure of ethylene, and the alkali molar ratio in the saponification procedure were changed. The products were dried to remove the solvents, and the modified PVA polymers (P-2 to P-6) were obtained. The results of analysis are shown in Table 1.

Production Example 7 to 11 of a PVA Polymer (Modified Saponified Vinyl Ester Copolymer)

The polymerization and saponification were conducted in the same manner as in Production Example 1 except that ethylene was not used and the amounts of vinyl acetate monomer, methanol and initiator and the alkali molar ratio in the saponification procedure were changed. The products were dried to remove the solvents, and the PVA polymers (P-7 to P-11) were obtained. The results of analysis are shown in Table 1.

Production Example 12 of a Modified PVA Polymer (Modified Saponified Vinyl Ester Copolymer) Containing a Carboxyl Group in a Side Chain Vinyl acetate (26.5 kg) and 33.5 kg of methanol were charged into a 100-liter pressure reaction vessel fitted with a stirrer, a nitrogen inlet, an ethylene inlet, an additive inlet and an initiator inlet, and were heated at 60° C. The inside of the system was then replaced with nitrogen by nitrogen bubbling for 30 minutes. Subsequently, ethylene was introduced such that the pressure of the reaction vessel reached 0.22 MPa. A solution of 2,2'-azobis(4-methoxy-2,4-dimethylvaleronitrile) as an initiator in methanol having a concentration of 2.8 g/liter was prepared, and a 10% solution of itaconic acid as a comonomer in methanol was prepared. These were respectively subjected to bubbling with a nitrogen gas for nitrogen replacement. After the inner temperature of the reaction vessel was adjusted to 60° C. and 11.8 g of itaconic acid was added, 95 ml of the initiator solution was poured to start the polymerization. During the polymerization, the pressure of the reaction vessel was maintained at 0.22 MPa by introducing ethylene, the polymerization temperature was maintained at 60° C., and the 10% methanol solution of itaconic acid was continuously added at a rate of 600 ml/hr and the initiator solution at a rate of 298 ml/hr respectively. After 5 hours, the conversion reached 60%, when the cooling was conducted to stop the polymerization. After the reaction vessel was opened to remove ethylene, a nitrogen gas was bubbled to completely remove ethylene. The unreacted vinyl acetate monomer was then removed under reduced pressure to obtain a methanol solution of a modified PVAc polymer. To the solution adjusted to 30% was added an NaOH methanol solution (10% concentration) for saponification such that an alkali molar ratio (a ratio of a molar amount of NaOH to a molar amount of a vinyl ester unit in the PVAc polymer) reached 0.02. A degree of saponification of the modified PVA polymer was measured in a usual manner according to JIS K 6726, and found to be 98 mol %.

The methanol solution of the PVAc polymer obtained by removing the unreacted vinyl acetate monomer after the polymerization was charged into n-hexane to precipitate the PVAc polymer, and the PVAc polymer recovered was dissolved in acetone. This purification by reprecipitation was conducted three times, and the product was then vacuum-dried at 60° C. to obtain the PVAc polymer purified. The content of the ethylene unit was 5 mol % and the content of the itaconic acid unit was 1 mol % respectively as obtained by proton NMR measurement of the PVAc polymer. Further, the methanol solution of the PVAc polymer was saponified at an alkali molar ratio of 0.2. The Soxhlet extraction was conducted with methanol for 3 days, and then dried to obtain the modified PVA polymer purified. An average degree of polymerization of the PVA polymer was measured in a usual manner according to JIS K 6726, and found to be 400.

By the foregoing procedures, the modified PVA polymer (P-12) having a degree of polymerization of 400, a degree of saponification of 98 mol % and an ethylene content of 5 mol % and containing a carboxyl group as an ionic group in a side chain was obtained. The results of analysis are shown in Table 1.

Production Example 13 of a PVA Polymer Containing a Carboxyl Group in a Side Chain The polymerization and saponification were conducted in the same manner as in Production Example 12 except that ethylene was not used and the amounts of vinyl acetate monomer, methanol and initiator and the alkali molar ratio in the saponification procedure were changed. The products were dried to remove the solvents, and the PVA polymer (P-13) containing a carboxyl group in a side chain was obtained. The results of analysis are shown in Table 1.

TABLE 1

| | Sample | Degree of polymerization | Degree of saponification (mol %) | Ethylene content (mol %) | Ionic comonomer (mol %) |
|---|---|---|---|---|---|
| Production Ex. 1 | P-1 | 500 | 98 | 10 | — |
| Production Ex. 2 | P-2 | 1000 | 98 | 7 | — |
| Production Ex. 3 | P-3 | 2000 | 98 | 6 | — |
| Production Ex. 4 | P-4 | 2800 | 98 | 4 | — |
| Production Ex. 5 | P-5 | 3400 | 98 | 2 | — |
| Production Ex. 6 | P-6 | 4000 | 98 | 2 | — |
| Production Ex. 7 | P-7 | 500 | 98 | 0 | — |
| Production Ex. 8 | P-8 | 1000 | 98 | 0 | — |
| Production Ex. 9 | P-9 | 2000 | 80 | 0 | — |
| Production Ex. 10 | P-10 | 700 | 70 | 0 | — |
| Production Ex. 11 | P-11 | 250 | 40 | 0 | — |
| Production Ex. 12 | P-12 | 400 | 98 | 5 | 1 |
| Production Ex. 13 | P-13 | 500 | 40 | 0 | 1 |

Example 1 to 8 and Comparative Example 1 to 5

Polymerization of Vinyl Chloride

An autoclave with glass lining was charged with 40 parts of deionized water containing a dispersion stabilizer shown in Table 2 and 0.04 part of a 70% toluene solution of diisopropyl peroxydicarbonate. The inside of the autoclave was deaerated until the pressure reached 0.0067 MPa to remove oxygen. Then, 30 parts of a vinyl chloride monomer was charged therein, and the mixture was heated at 57° C. while being stirred to conduct polymerization. At the outset of the polymerization, the pressure inside the vessel was 0.83 MPa. After 7 hours from the outset of the polymerization, this pressure reached 0.44 MPa, when the polymerization was stopped. The unreacted vinyl chloride monomer was purged, and the content was withdrawn, dehydrated, and dried. A polymerization yield of the vinyl chloride polymer was 85%. An average degree of polymerization thereof was 1,050. Polymerizabilities of vinyl chloride monomer, properties of the vinyl chloride polymers and waste water after polymerization were evaluated by the foregoing methods. The results of evaluation are shown in Table 2.

TABLE 2

| | Dispersion stabilizer | | | | | Polymerization stability Scale adhesion | Property of a vinyl chloride polymer Bulk density (g/cm³) | waste water after polymerization Clarity |
|---|---|---|---|---|---|---|---|---|
| | Modified PVA(A) | PVA(B) | PVA(C) | Weight ratio (A)/((B)+(C)) | Weight ratio (B)/(C) | Amount (wt %/ monomer) | | |
| Ex. 1 | P-1 | P-9 | P-13 | 30/70 | 70/30 | 0.12 | ○ | 0.576 | ◉ |
| Ex. 2 | P-2 | P-10 | P-13 | 20/80 | 80/20 | 0.12 | ○ | 0.578 | ◉ |
| Ex. 3 | P-2 | P-10 | P-11 | 20/80 | 80/20 | 0.12 | ○ | 0.574 | ◉ |
| Ex. 4 | P-3 | P-9 | P-13 | 20/80 | 80/20 | 0.10 | ○ | 0.570 | ◉ |
| Ex. 5 | P-4 | P-10 | P-13 | 30/70 | 70/30 | 0.10 | ○ | 0.574 | ○ |
| Ex. 6 | P-4 | P-10 | P-11 | 30/70 | 70/30 | 0.10 | ○ | 0.570 | ○ |
| Ex. 7 | P-12 | P-9 | P-13 | 30/70 | 70/30 | 0.12 | ○ | 0.570 | ◉ |
| Ex. 8 | P-1 | P-9 | P-11 | 30/70 | 70/30 | 0.12 | ○ | 0.572 | ◉ |
| Comp. Ex. 1 | P-7[*1] | P-9 | P-13 | 30[*1]/70 | 70/30 | 0.12 | Δ | 0.499 | ○ |
| Comp. Ex. 2 | P-8[*1] | P-10 | P-13 | 20[*1]/80 | 80/20 | 0.12 | x | 0.522 | x |
| Comp. Ex. 3 | P-5[*2] | P-9 | P-13 | 20[*2]/80 | 80/20 | 0.10 | ○ | 0.569 | Δ |
| Comp. Ex. 4 | P-6[*2] | P-9 | P-13 | 30[*2]/70 | 70/30 | 0.10 | ○ | 0.575 | x |
| Comp. Ex. 5 | — | P-10 | P-13 | 0/100 | 80/20 | 0.10 | Δ | 0.490 | ○ |

[*1]: PVA
[*2]: Modified PVA

The dispersion stabilizer for suspension polymerization of a vinyl compound in the invention exhibits quite excellent suspension polymerization stability and can produce a vinyl polymer having a high bulk density. Further, the dispersion stabilizer in the invention can prevent a milky turbidity of waste water after suspension polymerization, of which chemical oxygen demand (COD) is low, therefore an effect on the environment is extremely decreased. Thus, its industrial evaluation is quite high.

Obviously, numerous modifications and variations of the present invention are possible in light of the above teachings. It is therefore to be understood that within the scope of the appended claims, the invention may be practiced otherwise than as specifically described herein.

Japanese Application No. 310045/2001 filed on Oct. 5, 2001 is incorporated herein by reference in its entirety.

What is claimed is:

1. A dispersion stabilizer comprising a modified saponified vinyl ester copolymer (A) having an ethylene content of 1 to 20 mol %, a degree of saponification of 90 mol % or more and a degree of polymerization of 100 to 3,000, a saponified vinyl ester polymer (B) having a degree of saponification of 60 to 90 mol % and a degree of polymerization of 600 to 4,000, and a vinyl saponified ester polymer (C) having a degree of saponification of 30 to 60 mol % and a degree of polymerization of 100 to 600,
wherein a component (A)/{component (B)+component (C)} weight ratio is from 5/95 to 40/60.

2. The dispersion stabilizer according to claim 1, wherein a difference in degree of saponification between the saponified vinyl ester polymer (B) and the saponified vinyl ester polymer (C) is 10 mol % or more, a difference in degree of polymerization between the saponified vinyl ester polymer (B) and the saponified vinyl ester polymer (C) is 200 or more, or a combination thereof.

3. The dispersion stabilizer according to claim 1, wherein the modified saponified vinyl ester copolymer (A) is a water-soluble or water-dispersible polymer having a carboxyl group, a sulfonic group, an amino group, an ammonium group or a cationic group.

4. The dispersion stabilizer according to claim 1, wherein the modified saponified vinyl ester copolymer (A) has an ethylene content of from 1 to 18 mol %.

5. The dispersion stabilizer according to claim 1, wherein the modified saponified vinyl ester copolymer (A) has an ethylene content of from 1 to 15 mol %.

6. The dispersion stabilizer according to claim 1, wherein the modified saponified vinyl ester copolymer (A) has an ethylene content of from 2 to 10 mol %.

7. The dispersion stabilizer according to claim 1, wherein the modified saponified vinyl ester copolymer (A) has a degree of polymerization of from 150 to 2,800.

8. The dispersion stabilizer according to claim 1, wherein the modified saponified vinyl ester copolymer (A) has a degree of polymerization of from 250 to 2,200.

9. The dispersion stabilizer according to claim 1, wherein the weight ratio saponified vinyl ester polymer (B)/ saponified vinyl ester polymer (C) is from 25/75 to 80/20.

10. The dispersion stabilizer according to claim 1, wherein the modified saponified vinyl ester copolymer (A), the saponified vinyl ester polymer (B), the saponified vinyl ester polymer (C) or a combination thereof, has an ionic group selected from the group consisting of a carboxyl group, a sulfonic group, an amino group and an ammonium group.

11. In a process comprising polymerizing one or more vinyl compounds in an aqueous dispersion in the presence of a dispersion stabilizer and an oil-soluble initiator, the improvement comprising,
stabilizing the dispersion with a dispersion stabilizer comprising a modified saponified vinyl ester copolymer (A) having an ethylene content of from 1 to 20 mol %, a degree of saponification of 90 mol % or more and a degree of polymerization of from 100 to 3,000, a saponified vinyl ester polymer (B) having a degree of saponification of from 60 to 90 mol % and a degree of polymerization of 600 to 4,000, and a saponified vinyl ester polymer (C) having a degree of saponification of from 30 to 60 mol % and a degree of polymerization of from 100 to 600,
wherein the weight ratio of component (A)/{component (B)+component (C)} is from 5/95 to 40/60.

12. The process of claim 11, wherein the difference in the degree of saponification between the saponified vinyl ester polymer (B) and the saponified vinyl ester polymer (C) is 10 mol % or more, a difference in the degree of polymerization between the saponified vinyl ester polymer (B) and the saponified vinyl ester polymer (C) is 200 or more, or a combination thereof.

13. The process of claim 11, wherein the modified saponified vinyl ester copolymer (A) is a water-soluble or water-dispersible polymer having a carboxyl group, a sulfonic group, an amino group, an ammonium group or a cationic group.

14. The process of claim 11, wherein the vinyl compounds comprise vinyl chloride.

15. A process comprising polymerizing one or more vinyl compounds in the presence of a dispersion stabilizer comprising a modified saponified vinyl ester copolymer (A) having an ethylene content of 1 to 20 mol %, a degree of saponification of 90 mol % or more and a degree of polymerization of 100 to 3,000, a saponified vinyl ester polymer (B) having a degree of saponification of 60 to 90 mol % and a degree of polymerization of 600 to 4,000, and a saponified vinyl ester polymer (C) having a degree of saponification of 30 to 60 mol % and a degree of polymerization of 100 to 600, wherein a component (A)/{component (B)+component (C)} weight ratio is from 5/95 to 40/60, wherein the polymerization is a suspension polymerization and the vinyl compounds comprise vinyl chloride.

* * * * *